United States Patent
Moore et al.

[11] Patent Number: 5,663,506
[45] Date of Patent: Sep. 2, 1997

[54] CAPACITIVE TEMPERATURE AND PRESSURE TRANSDUCER

[75] Inventors: James O. Moore, Worcester; Raymond H. Kohler, Souderton; Philip R. Klauder, Ambler, all of Pa.

[73] Assignee: Moore Products Co., Spring House, Pa.

[21] Appl. No.: 517,529

[22] Filed: Aug. 21, 1995

[51] Int. Cl.⁶ .......................... G01L 19/04; G01L 9/12
[52] U.S. Cl. ........................ 73/708; 73/718; 73/724
[58] Field of Search ...................... 73/718, 719, 724, 73/725, 708; 338/4; 361/283; 29/5 G

[56] References Cited

U.S. PATENT DOCUMENTS

| | | | |
|---|---|---|---|
| 2,937,369 | 12/1960 | Newbold et al. | 340/177 |
| 3,631,342 | 12/1971 | McDonald | 324/120 |
| 3,716,782 | 2/1973 | Henry | 324/61 R |
| 3,753,373 | 8/1973 | Brown | 73/98 |
| 4,187,460 | 2/1980 | Dauge et al. | 324/60 CD |
| 4,193,063 | 3/1980 | Hitt et al. | 340/20 D |
| 4,257,274 | 3/1981 | Shimada et al. | 73/718 |
| 4,295,090 | 10/1981 | Ponkala | 324/60 CD |
| 4,295,091 | 10/1981 | Ponkala | 324/60 CD |
| 4,420,790 | 12/1983 | Golke et al. | 361/283 |
| 4,459,541 | 7/1984 | Fielden et al. | 324/60 CD |
| 4,481,465 | 11/1984 | Fredericks et al. | 324/60 CD |
| 4,542,435 | 9/1985 | Freud et al. | 361/283 |
| 4,565,096 | 1/1986 | Knecht | 73/718 |
| 4,598,381 | 7/1986 | Cucci | 364/558 |
| 4,625,560 | 12/1986 | Sanders | 73/718 |
| 4,633,168 | 12/1986 | Venema | 324/60 CD |
| 4,644,798 | 2/1987 | Tamura et al. | 73/708 |
| 4,730,496 | 3/1988 | Knecht et al. | 73/724 |
| 4,735,098 | 4/1988 | Kavli et al. | 73/718 |
| 4,790,192 | 12/1988 | Knecht | 73/721 |
| 4,852,408 | 8/1989 | Sanders | 73/718 |
| 4,864,463 | 9/1989 | Shkedi et al. | 361/283 |
| 5,022,270 | 6/1991 | Rud, Jr. | 73/706 |
| 5,317,922 | 6/1994 | Bomback et al. | 73/724 |
| 5,332,469 | 7/1994 | Mastrangelo | 156/643 |

FOREIGN PATENT DOCUMENTS

| | | | |
|---|---|---|---|
| 5930035 | 2/1984 | Japan | G01L 9/04 |
| 161641 | 3/1989 | Japan | G01L 9/04 |
| WO8501356 | 6/1984 | WIPO | G01R 27/26 |

*Primary Examiner*—Richard Chilcot
*Assistant Examiner*—William L. Oen
*Attorney, Agent, or Firm*—Seidel, Gonda, Lavorgno & Monaco, P.C.

[57] ABSTRACT

A monolithic temperature and pressure transducer having a plurality of capacitive sensors. The capacitors are formed from the same silicon substrate and are equally affected by temperature variations, including temperature gradients.

18 Claims, 4 Drawing Sheets

CAPACITIVE TEMPERATURE AND PRESSURE TRANSDUCER

FIELD OF THE INVENTION

The present invention relates to a pressure transducer system for accurately measuring such parameters as pressure and temperature and for calculating, among other data, mass flow. The system includes a monolithic multi-variable capacitive sensor and its associated circuitry.

BACKGROUND OF THE INVENTION

Pressure transducers used to measure the pressure of a process fluid (gas or liquid) flowing through a pipe are known in the art. Pressure transducers are used in highly sensitive environments including refineries, the aerospace industry and power plants. The accurate detection of flow conditions is critical in ensuring the operation and safety of the industries in which pressure transducers are used.

Many pressure transducers utilize a semiconductor sensor comprised of a parallel plate capacitor. Parallel plate capacitors are known in the art wherein one plate is formed of a semiconductor material and the second plate is formed of a metal deposited on a dielectric. A second or spacing dielectric (e.g., air or silicon oil) fills the space between the two capacitor plates.

Under normal operations, transducers are subject to physical forces (including vibrations, compression and stress), pressure irregularities and temperature fluctuations which can decrease the accuracy of the measurements. Variations in temperature are extremely common and are particularly troublesome. Temperature changes cause the separation between the capacitor plates to vary due to thermal expansion or contraction of the semiconductor and the metalized dielectric. Temperature also affects the dielectric constant of the spacing dielectric (i.e., the silicon oil). The surface area of the plates also vary with the change in temperatures. The separation distance between the plates, the change in dielectric constant of the spacing dielectric and the variation in plate surface area each effect the capacitance of the sensor and ultimately decrease the accuracy of any pressure readings.

Prior art methods of compensating for temperature utilize a separate sensor (e.g., a thermistor which comprises two dissimilar metal bonded together—each metal having different coefficients of expansion) to provide temperature data. A microprocessor circuit then corrects for temperature variations through a series of calculations. Alternatively, the various components of the pressure transducers are "matched" in an attempt to make all components expand and contract the exact amounts with the fluctuations in temperature, thereby eliminating temperature as a variable.

Traditional pressure sensors are designed to measure either a differential or an absolute pressure. They are usually optimized to accurately measure only a relatively small range of pressures. For instance, a sensor that is designed to accurately measure an absolute pressure that varies from 0 to 50 psi gage, will be unable to measure any pressures over 50 psi. On the other hand, a sensor that is designed to measure pressure in the range of 0 to 5000 psi gage cannot accurately measure a pressure that only varies from 0 to 50 psi gage. If an accurate measurement of this lower pressure range is desired, a separate sensor will be required. Moreover, if measurements of differential pressure or gage pressure are also required, additional sensors would be needed.

SUMMARY OF THE INVENTION

The present invention comprises means for detecting temperature variations and providing a temperature sensor signal representative of the temperature variation; means for sensing an absolute pressure and for providing an absolute sensor signal representative of the absolute pressure; and means for sensing a differential pressure and for providing a differential sensor signal representative of the differential pressure.

The pressure sensors can be capacitive sensors that are commonly known. In a preferred embodiment, the temperature detecting means is a parallel plate, semiconductor capacitor. More particularly, the capacitor that detects temperature is formed on a single, monolithic structure with the pressure sensors.

The sensor signals for the pressures are individually compared to the temperature sensor signal to determine a ratio. Since the capacitors that sensed the pressure are also affected by temperature variations, each ratio reduces any inaccuracies due to temperature variations. In addition, the monolithic structure eliminates any temperature variation due to temperature gradient which is commonly present when sensors are separated by physical distances.

In a preferred embodiment, the analog signals generated by the sensors are converted into digital signals, thereby allowing the use of digital circuitry. The digital circuitry can select and store the appropriate sensor signals, compare them at a later time, and have them available for further calculations (e.g., to determine mass flow).

The monolithic sensor structure is comprised of layers of glass and silicon bonded together. At least one silicon layer is used as a common plate that is shared by all of the capacitors used to detect temperature and pressure.

The capacitors which detect pressure are variable capacitors and are designed by thinning certain regions of a silicon layer to form pressure-sensitive diaphragms. The diaphragms are preferably made out of the silicon layer that forms the common plate for all capacitors. A diaphragm and an oppositely facing metalized section on the glass layer form the necessary capacitor plates.

Apertures and/or channels produced in the glass and silicon layers are used to expose the diaphragms to the desired pressures in order to be detected. When a diaphragm deflects under pressure, the capacitance between the plates change. Each capacitor can be designed to detect a specific pressure and/or to measure a specific range of pressures.

The capacitor used to detect temperature has one plate formed on a metalized portion of the glass layer and the second plate formed from the same silicon layer which is used to form the diaphragms for the variable capacitors that detect pressure. The top surface of the common silicon layer provides the electrically conductive surface to form one of the required two capacitor plates. Since, the temperature sensing capacitor does not use a diaphragm. Therefore, the temperature sensing capacitor is unaffected by pressure changes. However, as the temperature fluctuates, thermal compression and expansion affects the silicon layer and the metalized layer that form the parallel plates of the temperature sensing capacitor. Thermal variations also change the dielectric constant of the silicon oil.

All of the aforementioned factors affect the capacitance value of the temperature sensing capacitor. The temperature fluctuations affect the pressure sensing capacitors in a similar manner. Therefore, by comparing the capacitance of the temperature sensing capacitor to the capacitance of either pressure sensing capacitor, the pressure measurements are immediately corrected for temperature variations.

In addition, all capacitors (temperature and pressure sensing) undergo the same compression and expansion due to temperature variations as the pressure sensing capacitors. Further, since they all share the same spacing dielectric (i.e. silicon oil), the capacitance variations due to temperature gradients are eliminated. Another advantage of a monolithic structure (i.e., placing all sensors on one device) are that multiple pressures can be detected, including specific ranges of pressure, without the expense of using and installing multiple pressure sensors. Moreover, since all the diaphragms and apertures are formed on all of the sensor layers at the same time, the sensor is no more expensive to produce than traditional single diaphragm sensors.

Although the preferred embodiment utilizes three capacitors (one for temperature and two for pressure), the number of capacitors, the parameters they measure and the pressure range to which they are sensitive can easily be designed into a particular monolithic structure. For example, the use of a three capacitor monolithic structure provides the necessary information for accurately measuring mass flow.

The objects and advantages of the subject invention will become apparent after considering the following description and the accompanying drawings.

DETAILED DESCRIPTION OF THE PREFERRED EMBODIMENT

Figure 1:
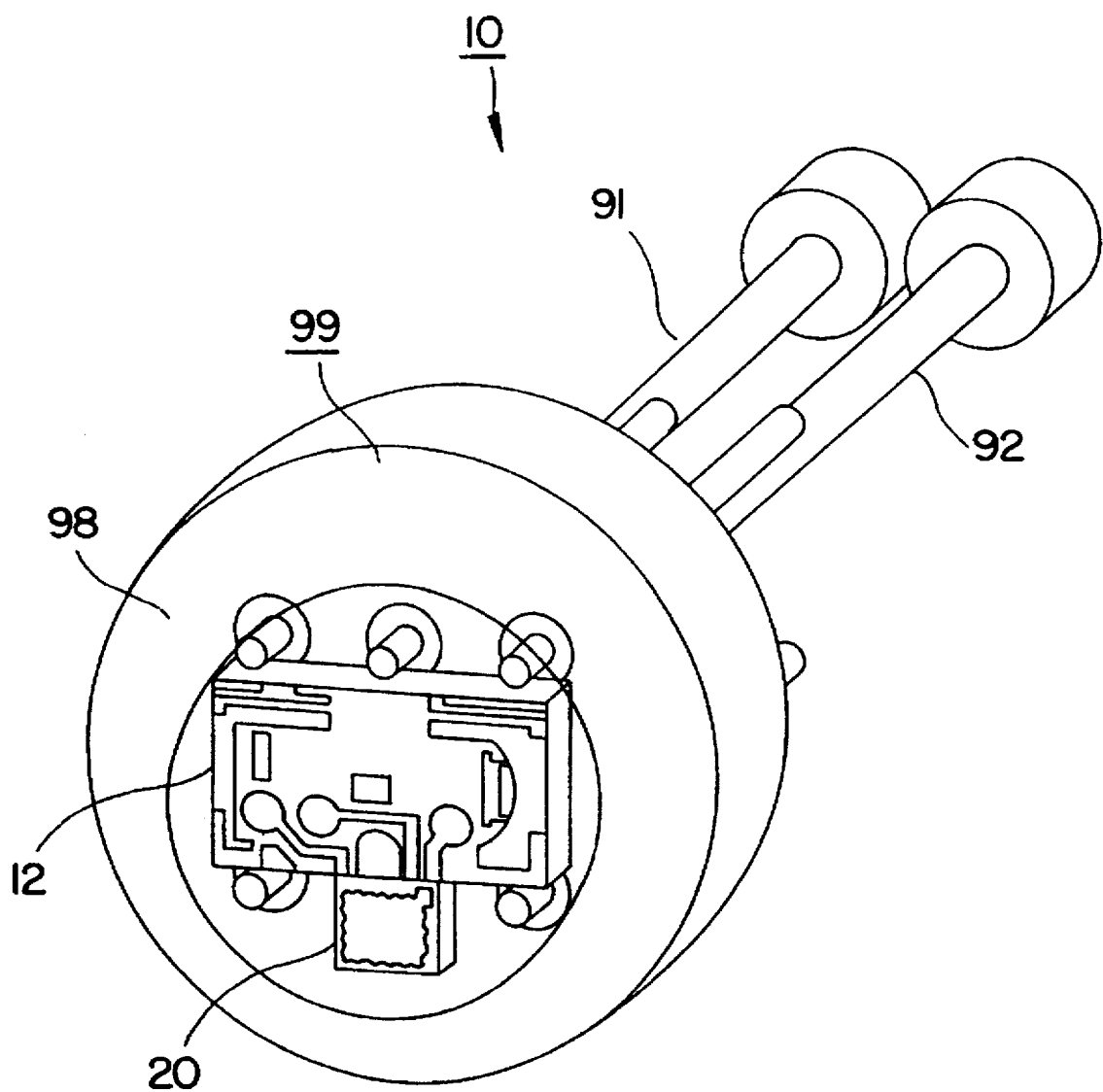
FIG. 1 is a perspective view of the preferred header assembly utilized in connection with the subject temperature and pressure transducer.

Referring now to the drawings, the preferred embodiment of the temperature and pressure transducer in accordance with the present invention is generally indicated at 10. Referring to FIG. 1, the sensing device is preferably a monolithic sensor structure 12 having a plurality of sensors (both temperature and pressure). The monolithic sensor 12 resembles a semiconductor chip and is manufactured in a similar manner as that of a semiconductor chip, however it is a passive device.

The monolithic sensor structure 12 is mounted to a header plate 98 of a header 99 for connection to a manifold (not shown) via a first pressure tube 91 and a second pressure tube 92. The manifold is connected in the usual manner to the device (e.g., gas pipe, pitot tube, storage tank, etc.) in which the fluid to be measured (i.e., the process fluid) is present. If the process fluid is natural gas flowing through a pipe, the first pressure may be the upstream pressure of the natural gas and the second pressure may be the downstream pressure of the natural gas after it passes an orifice. The manifold separates the sensitive components of the monolithic sensor structure 12 from the possible corrosive effects of the process fluid.

A detection circuit 20 sends an electrical signal to a selected sensor on the monolithic sensor structure 12 for reading the desired sensor value. In the preferred embodiment, the detection circuit which is connected to the sensors is a custom integrated circuit (IC) chip and is referred to as an Enhanced Mode Oscillating (EMO) circuit 20. When capacitive pressure sensors are used, the circuit detects the capacitance which vanes directly with any variations in pressure (i.e., the capacitance is directly proportional to the pressure). In the case of a temperature sensing capacitor, its capacitance varies only with changes in temperature.

The enhanced mode oscillating circuit 20 is preferably mounted proximate the monolithic sensor 12. This reduces the physical size of the header 99, limits undesirable capacitor fluctuations (e.g., parasitic capacitances due to lead lengths), and minimizes any effects due to temperature gradients.

The header 99 pressure media isolates the circuit 20 and the sensor 12 from the process fluid. This is done by sealing the header and filling the header 99 with silicon oil. The header also electrically isolates the EMO circuit 20 and the pressure sensors of the monolithic sensor structure 12.

Figure 2:
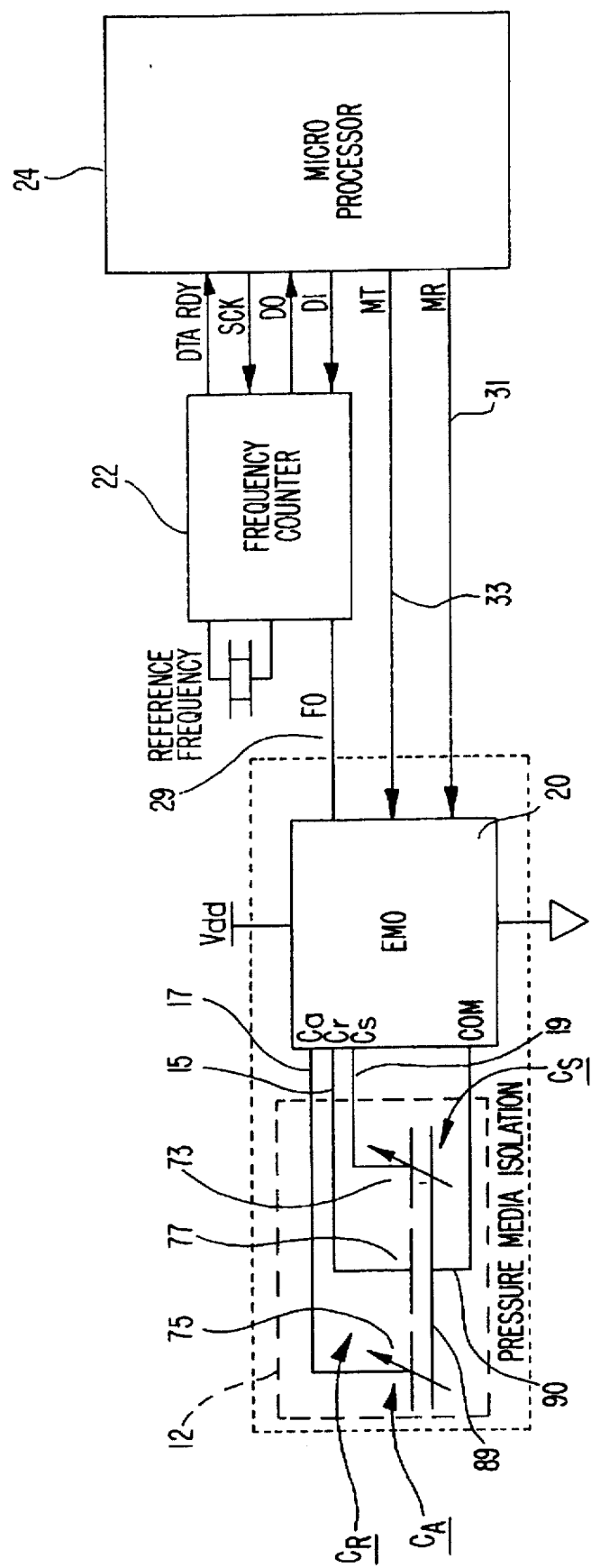
FIG. 2 is a schematic block diagram of the preferred embodiment of the temperature pressure transducer in accordance with the instant invention.

Referring now to FIG. 2, the isolation provided by header 99 is represented by the dashed lines around the monolithic sensor 12 and the EMO circuit 20. The monolithic structure 12 includes three capacitors $C_R$, $C_A$, and $C_S$.

The monolithic sensor 12 permits the use of a common capacitor plate 89 for all of the capacitors. In addition, the proximity of all sensors to each other means that any temperature variations equally effect all sensors. (Note that this is especially true when compared to the use of separate sensors in which the construction materials may be different and in which the sensors are physically separated which may produce a temperature gradient across the several sensors.) Another advantage of using a monolithic structure is the reduction of manufacturing costs as compared to using three separate sensors.

The first sensor includes capacitor $C_R$ the capacitance of which varies with respect to temperature only. The signal initiated by $C_R$ is the temperature sensor signal. The second and third sensors include capacitors $C_A$ and $C_S$, respectively, which are variable capacitors, the capacitance of which vary primarily with changes in pressure but are also affected by temperature. The upper capacitor plate 67 of capacitor $C_R$ is connected to the EMO circuit 20 via lead wire 15. Similarly, the upper plates 65 and 63 of capacitors $C_A$ and $C_S$, respectively, are individually connected to the EMO circuit 20 via wires 17 and 19, respectively. The common capacitor plate 89 is connected to the EMO circuit 20 via lead 90.

The EMO circuit 20 can be interfaced directly to any microprocessor controller (e.g., Motorola 68HC11) that has at least two digital outputs and a serial input. In the preferred embodiment, the EMO circuit 20 is electrically connected to a frequency counter 22 via wire 29 (FO) and microprocessor 24 via wires 31 and 33 (MR and MT, respectively) as shown in FIG. 2. The microprocessor 24 can select which capacitor is being measured through the EMO circuit 20.

The temperature or pressure is measured by detecting the capacitance of the desired capacitor $C_R$, $C_A$ or $C_S$. The EMO circuit 20 converts the signal from each capacitor into a digital signal FO (preferably a square wave). The period $T_O$ of the digital signal is directly proportional to the capacitance of the sensor. Since the capacitance is directly proportional to the detected variable (temperature or pressure), the period of the digital signal output from the EMO circuit 20 is directly proportional to the detected temperature or pressure. (Since frequency is inversely proportional to the period, the frequency of output signal FO is inversely proportional to the capacitance of the selected sensor and, therefore, the frequency is inversely proportional to the respective detected variable).

The frequency (or period) of the output signal FO for each operating mode of the EMO circuit 20 is measured by a frequency counter 22 and converted to a number. This number is transmitted to the processor 24 in serial form via data out line $D_O$. The data in line $D_I$ can be used to read in data to set up the frequency counter 22 in its preferred mode of operation. The Data Ready line (Dta Rdy) indicates to the processor that the information has been received by the frequency counter. The serial clock line SCK provides the timing for the transfer of information between the frequency counter 22 and the microprocessor 24.

Figure 3:
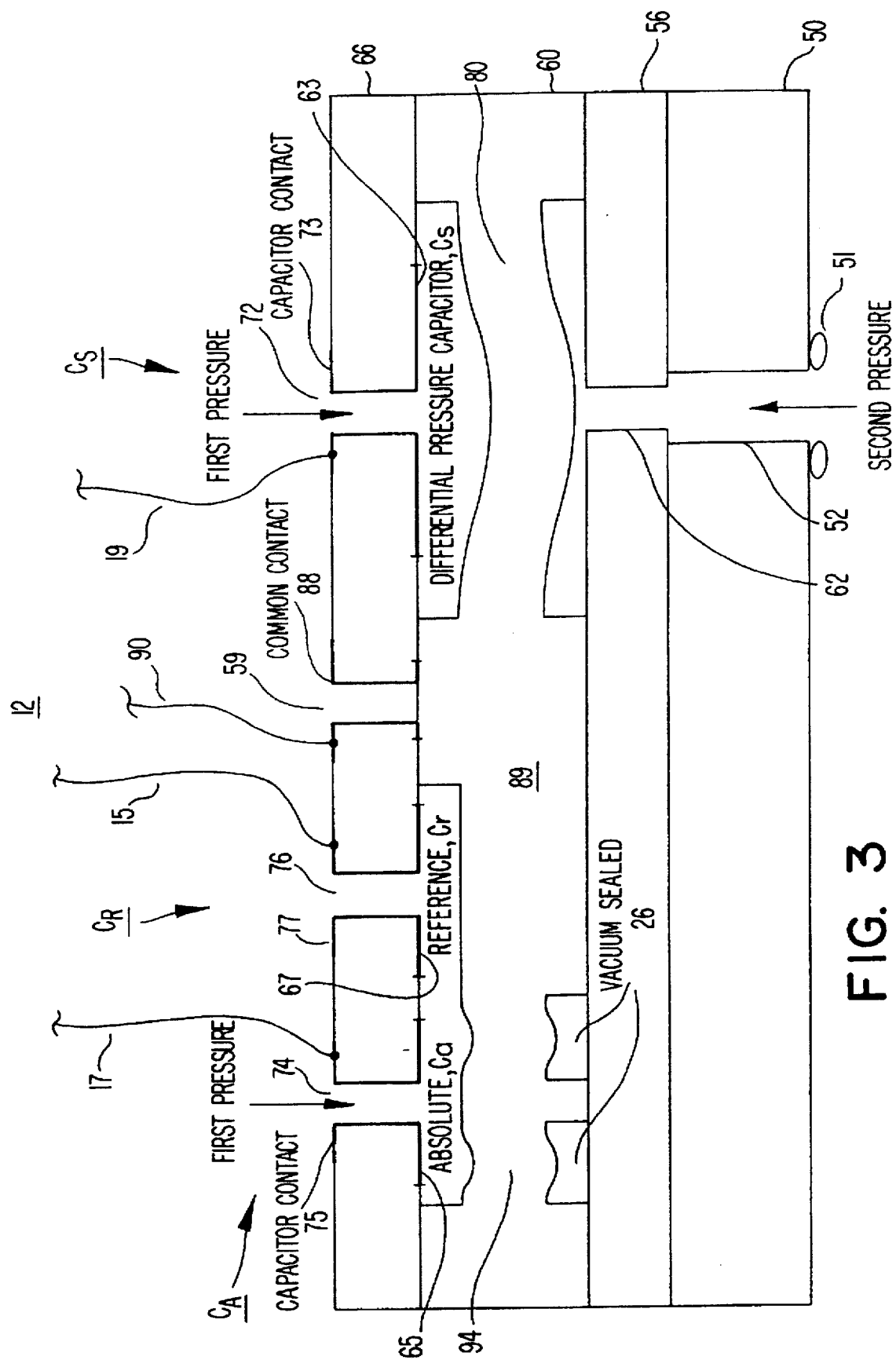
FIG. 3 is an enlarged cross-sectional view of the preferred embodiment of the monolithic pressure sensor used in the subject temperature and pressure transducer system.

Referring now to FIG. 3, the preferred monolithic sensor 12 is shown in cross-section. The monolithic sensor 12 comprises alternating layers of a semiconductor substrate (preferably silicon) and a first dielectric (preferably glass) which are attached to each other by anodic bonding. A first silicon layer 50 is directly bonded the header plate 98 (see FIG. 1). A first glass layer 56 is positioned over the first silicon layer 50. Apertures 52, 58 of the first silicon layer and first glass layer, respectively, provide a means of entry for a second pressure via second tube 92 of the header 99. An epoxy ring 51 isolates the aperture 52 from outside influences and bonds the silicon layer 50 to the header plate.

The plurality of capacitors are formed on a second semiconductor layer 60. The second semiconductor layer 60 serves as the common plate 89 for all capacitors of the monolithic sensor 12. The first capacitor $C_R$, has a fixed capacitance—with respect to pressure—and is used to measure the reference condition or temperature. The second capacitor $C_A$ is a variable capacitor used to measure the absolute pressure (i.e., the first pressure). The third capacitor $C_S$ is also a variable capacitor which is used to measure the differential pressure (i.e., the difference in pressure between the first and second pressures). All capacitors are sensitive to temperature variations.

The monolithic pressure sensor 12 uses multiple diaphragms to form a plurality of custom variable capacitors that measure different types of pressure over a pre-designed range. The pressure measuring diaphragms are formed by thinning certain regions of one or more of the silicon layers. The width, thickness and length of the diaphragms can be precisely machined to control pressure range, sensitivity, etc. The diaphragms form the bottom capacitor plate 89 of the variable capacitors. The various apertures in the glass and silicon layers are used to expose the diaphragms to the desired pressures.

In the preferred embodiment, the diaphragms are cut into the second silicon layer 60. All of the diaphragms of the monolithic structure 12 are electrically connected since they are made of a single piece of silicon 60. The second silicon layer 60 forms the common capacitor plate 89 of variable capacitors $C_A$ and $C_S$ which are sensitive to pressure variations.

The second glass layer 66 is bonded to the second silicon layer 60. Second glass layer 66 includes a plurality of through holes or apertures for sensing the temperature and a first pressure delivered from the measured device by first tube 91 of header 99 (see FIG. 1). In particular, aperture 72 is associated with $C_S$, aperture 74 is associated with $C_A$ and aperture 76 is associated with $C_R$.

The top or second capacitor plates 63 and 65 of capacitors $C_S$ and $C_A$, respectively, are formed by plating metal to the underside of second glass layer 66. Similarly, metal is plated to the bottom side of second glass layer 66, proximate absolute sensing diaphragm 94, to form the top capacitor plate 65 of capacitor $C_A$. Finally, metal is plated to the bottom side of glass layer 66, opposite differential sensing diaphragm 80, to form top plate 63 of capacitor $C_S$.

Aperture 74 is metalized to connect top plate 65 to terminal 75 on the top side of second glass layer 66. Terminal 73 formed on the top side of glass layer 66 is electrically connected to the top plate 63 by metalizing aperture 72. Terminals 75 and 73 provide convenient electrical contact points for connecting wires 17 and 19, respectively, to the EMO circuit 20.

Differential pressure sensing diaphragm 80 is used to detect the differential pressure between the first pressure which enters through aperture 72 via first tube 91, and the second pressure which enters through apertures 52 and 62 via second tube 92. Differential pressure sensing diaphragm 80 deflects as it is subject to the two pressures. The deflection of diaphragm 80 changes the capacitance of $C_S$ in direct proportion to the pressure differential since diaphragm 80 forms the bottom capacitor plate of $C_S$. EMO circuit 20 detects the change in capacitance across top capacitor plate 63 and diaphragm 80 of capacitor $C_S$.

An absolute pressure sensing diaphragm 94 is formed above vacuum sealed cavities 26. Absolute pressure sensing diaphragm 94 forms the bottom or common capacitor plate of capacitor $C_A$. As the pressure entering through aperture 74 via first tube 91 fluctuates, the absolute pressure sensing diaphragm 94 is deflected thereby changing the capacitance $C_A$. The EMO circuit detects the change in capacitance across top capacitor plate 65 and diaphragm 94.

Referring again to FIG. 3, the top or second plate 67 of capacitor $C_R$ is preferably a metal plated to the bottom side of the second glass layer 66. The metal is also circumferentially plated up through aperture 76 to the top side of glass layer 66 forming a terminal 77. This terminal 77 provides a convenient contact point for connecting wire 15 to the EMO circuit 20.

Temperature sensing capacitor $C_R$ is not affected by pressure since the bottom or common capacitor plate directly underneath plate 67 is a solid portion of second silicon layer 60. That is, capacitor $C_R$ does not utilize a diaphragm and the first pressure which enters through aperture 76 cannot deflect the solid portion of the silicon layer 60. Accordingly, the capacitance of $C_R$ is constant regardless of the pressure which enters via first tube 91.

Annular terminal 88 is electrically connected to the common capacitor plate 89 formed by the second silicon layer 60 by metalizing aperture 59. A common conductor wire 90 is connected to terminal 88 providing the electrical contact between the common plate of each capacitor to the EMO circuit 20. Similarly, wires 15, 17 and 19, electrically connect the second capacitor plates 67, 65, 63 of capacitors $C_R$, $C_A$ and $C_S$, respectively, to the EMO circuit 20 via terminals 77, 75 and 73.

The first and second pressures which enter the header 99 via first and second tubes 91 and 92 depend on the device to be measured or the data to be collected. For example, when measuring the flow rate of the process fluid through an orifice, the first pressure is the "upstream" pressure of the process fluid and the second pressure is the "downstream" pressure. Similarly, if used to check the presence of a contaminant in a storage tank, the first pressure may be the pressure at the bottom of the tank and the second pressure may be the pressure at the top of the tank.

The differential pressure is measured by measuring the capacitance of capacitor $C_S$ between terminal 73 and common terminal 89 (i.e., across top capacitor plate 63 and bottom common capacitor plate 89). The common terminal 89 is connected to the EMO circuit 20 via wire 90 and terminal 73 is connected to the EMO circuit via wire 19. The difference in pressures between the first pressure entering through aperture 72 and the second pressure entering through apertures 52 and 62 causes the differential pressure sensing diaphragm 80 to deflect. In this case, the higher pressure on the top of the diaphragm deflects it downward thus causing a decrease in the capacitance of capacitor $C_S$.

In a similar manner, the first pressure deflects absolute pressure sensing diaphragm 94 of $C_A$. Since diaphragm 94 sits directly above one or more vacuum sealed compartments 26, the deflection of diaphragm 94 is directly proportional to the absolute pressure of the first pressure. That is, the actual value of the first pressure can be measured.

Figure 4:
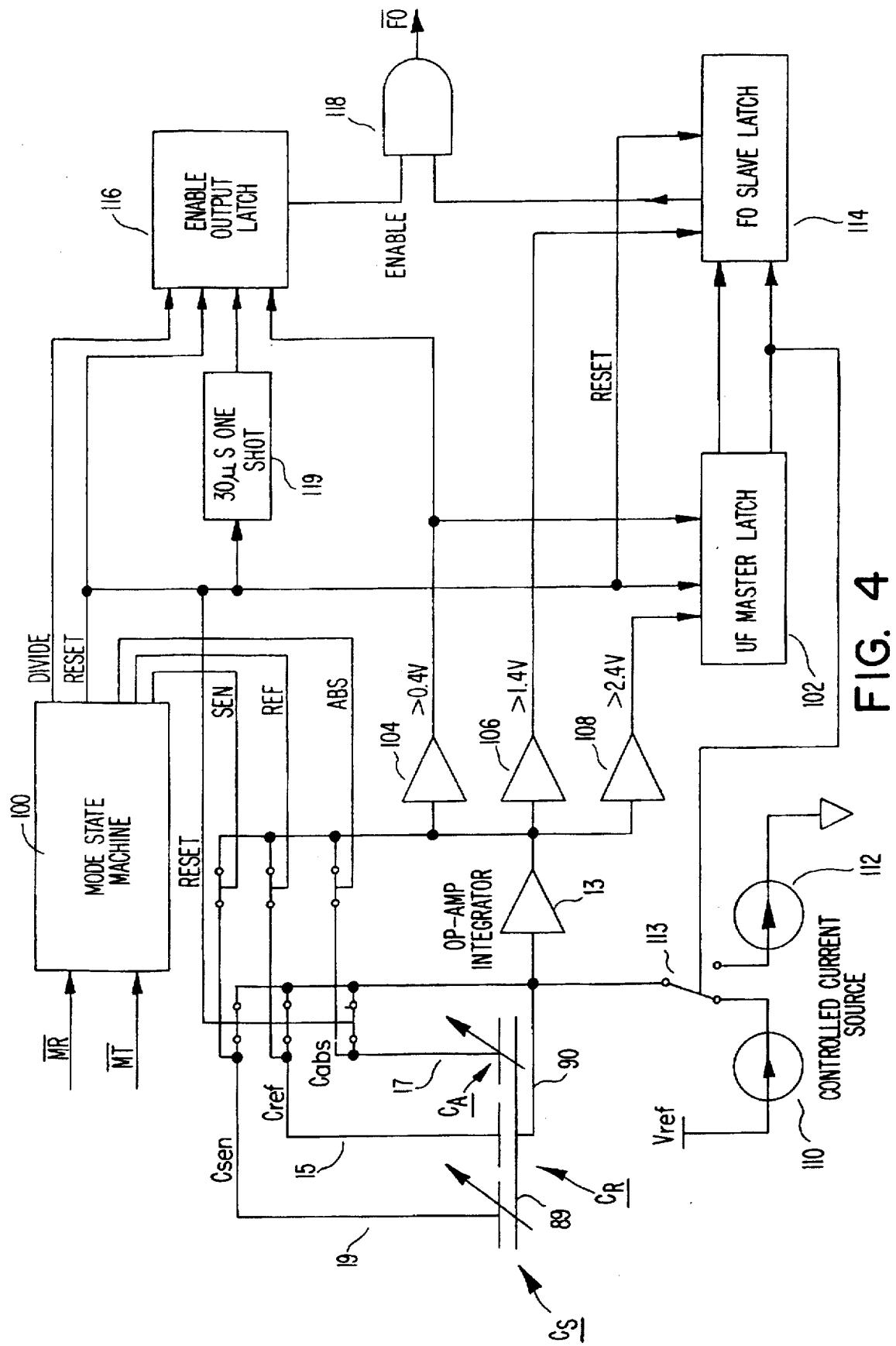
FIG. 4 is a schematic circuit diagram of the Enhanced Mode Oscillating circuit.

A schematic block diagram of the Enhanced Mode Oscillator circuit 20 is shown in FIG. 4. The function of the Enhanced Mode Oscillator (EMO) circuit 20 is to output an oscillation frequency signal FO that is proportional to the pressure or temperature detected by a capacitor. The three capacitors are sequentially activated in a predetermined order under control of the microprocessor 24. Two digital inputs $M_R$ and $M_T$ control mode switching which ultimately control a square wave frequency output FO. The three capacitors, $C_R$, $C_A$ and $C_S$, are connected to three outputs and to one feedback input of the EMO circuit 20.

The microprocessor, via line $M_R$, resets the EMO circuit 20. This directs the EMO circuit to measure the capacitance of $C_R$. At the appropriate time (i.e., after the microprocessor has stored the capacitance value), the microprocessor 24 sends the toggle signal $M_T$ to direct the EMO circuit to detect the capacitance of $C_A$. After the microprocessor 24 has stored the value of $C_A$, it signals the EMO circuit 20, via the $M_T$ line, to read the capacitance of $C_S$. After the three measurements have been taken, the microprocessor 24 again sends a signal on line $M_R$ to reset the EMO circuit 20 and start the cycle over. The microprocessor 24 typically directs the EMO circuit to take ten readings per second.

The master latch 102, in conjunction with op amps 104 and 108 and current sources 110 and 112, generates a triangle wave. The period T of the triangle wave is directly proportional to the measured capacitance of the selected capacitor. The slave latch 114 generates a square wave which has the same period as the triangle wave. The microprocessor 24, through mode state machine 100 and the Enable Output Latch 116, controls the output signal FO through "AND" gate 118.

Two current sources 110 and 112 are switched into an input of op-amp integrator 13 and three capacitors $C_R$, $C_S$ and $C_A$ are switched to the output of integrator 13. The integrator 13 output is coupled to three comparators 104, 106 and 108. Two of the comparators 104 and 108 trigger the Unscaled Frequency MASTER Latch 102. The feedback of UF MASTER Latch 102 controls switch 113 which directs the proper current source (110 or 112) connection, causing the integrator 13 output to swing between 0.4 V and 2.4 V. The triangle output of the integrator 13 causes the >1.4 V comparator 106 to produce a square wave output. The square wave clocks the FO SLAVE LATCH 114 on its rising and falling edges. The FO Slave Latch output pulses are "anded" with the enable signal in AND gate 118 to produce the FO output.

Two signals MR and MT are input to the MODE STATE MACHINE 100. The Mode State Machine 100 has three possible states: Ref, Sen, and Abs. When the MR is triggered the state sequence will be Ref, Abs, Sen. The mode state machine 100 controls switching of the capacitors $C_R$, $C_A$ and $C_S$ and generates the DIVIDE output. The are divided by two in order to equalize the period of FO as much as possible. Typically, when the data is read out it is scaled by 2 in order to make it consistent with the other T's.

The RESET output of the Mode State Machine 100 sets the UF MASTER Latch 102 and FO SLAVE Latch 114 and rests the ENABLE OUTPUT Latch 116 (disabling the output for one cycle). It also discharges the capacitors $C_R$, $C_A$ and $C_S$ and holds the integrator 13 output zeroed when the MR or MT lines are held low. If the reset lasts longer than 30 μsec the one shot 119 times out and the Enable output Latch 116 is enabled and FO will fall synchronously with the rise of MT or MR. Both the MR and MT pulses must be greater than 30 μsec for synchronous operation to occur. The DIVIDE output causes the ENABLE OUTPUT latch to toggle and disable every other pulse. This provides a synchronous start will eliminate the uncertainty for the start measurement so the error will be reduced from 2 counts to 1 count. Note that this applies to the system clock not the FO pulses which are always synchronized with the gate time.

It should be noted that the EMO circuit 20 is also effected by temperature (especially the current sources). Therefore, the oscillating frequency of FO is dependent not only on the selected capacitor but also on the current supplied by the EMO circuit. However, by placing the EMO proximate the monolithic sensor 12 (instead of outside of the header 99), inaccuracies due to temperature gradients are further minimized.

An example of the subject development measuring the pressure of a process fluid through a pipe across an orifice and the resulting calculation of pressures corrected for temperature variations will be discussed as follows. If the applied differential pressure (high pressure vs. low pressure), was 0 psi, the $F_O$ due to $C_R$ might be 2 kHz or 0.5 ms and the $F_O$ due to $C_S$ would be approximately the same. For a differential pressure of 2 psi which might typically represent full scale $F_O$ due to $C_R$ would remain the same but $F_O$ due to $C_S$ would increase to typically 3 kHz. If the absolute pressure (high pressure port) was 1 atmosphere the $F_O$ due to $C_S$, which is typically less sensitive to pressure than $C_r$, might be 2.1 kHz. In order to measure these frequencies the microprocessor controller 24 would send an MR pulse to the EMO circuit 20 which would set its state to connect the capacitor $C_R$ to the oscillator in the EMO circuit 20 and thus its period $F_O$ would be proportional to $C_R$. The frequency counter 22 will then count the 10 MHz pulses from the reference oscillator in D pulses of $F_O$. Thus, if the frequency counter 22 was configured by data sent via the $D_I$ (data in) line to count reference frequency pulses for ten $F_O$ pulses (D=10) the period of this $F_O$ would be represented by a count of 10*10 MHz/2 kHz or 50,000 and represent a resolution of 1 part in 50,000.

It is seen that the resolution can be increased at the expense of measurement time by increasing the number of $F_O$ pulses measured. The microprocessor controller 24 then sends an MT pulse which advances the EMO circuit to its next state—in this case to $C_A$. In a similar manner, the EMO circuit determines the frequency due to $C_A$. The next MT pulse causes the EMO circuit 20 to respond to $C_S$.

In order to get a signal representative of the differential pressure (difference between first and second pressures) and the absolute pressure (first pressure), the microprocessor controller 24 stores three numbers as described above representative of the capacitance value of $C_R$, $C_A$ and $C_S$. These numbers are also sensitive to temperature and it is desired that this influence be minimized; therefore the microprocessor controller 24 calculates the signal representative of differential pressure by determining the ratio $C_R/C_S$. In a like manner, the absolute pressure, substantially uninfluenced by the temperature, is calculated by determining the ratio $C_R/C_A$.

Since the capacitance of $C_R$ is not affected by pressure, the following parameters can be determined: $R_{Abs} = T_R/T_A \approx C_R/$ $C_A$ and $R_{Diff}=T_R/T_S \approx C_R/C_S$. Where $T_R$ is the period of output signal FO when the EMO is connected to capacitor $C_R$. In a like manner, $T_A$ and $T_S$ are the periods of output signal FO when the EMO is connected to capacitors $C_A$ and $C_S$, respectively. Since the temperature variations effected $C_R$, $C_A$ and $C_S$ substantially equally (because of the monolithic structure), the ratios $R_{Abs}$ and $R_{Diff}$ are independent of temperature.

In the example given, the computed ratio representative of differential pressure equal to zero is 1.0, if the differential pressure is increased to 2 psi the ratio might typically be 3 kHz/2 kHz=1.5. The ratio representative of absolute pressure of 1 atmosphere (14.7 psi) would typically be 2.1 kHz/2.0 kHz=1.05.

The temperature t of the process fluid is obtained by calibrating the microprocessor 24 to capacitor $C_R$ at a predetermined temperature $t_1$. The present temperature can be determined by comparing the capacitance of $C_{R(t2)}$ to the calibrated capacitance $C_{R(t1)}$. Therefore, $R_t=t_2/t_1=C_{R(t2)}/C_{R(t1)}$.

The ratios $R_t$, $R_{Abs}$ and $R_{Diff}$ can be used to calculate other parameters, for example mass flow rate. This calculation is described in American Gas Association Report No. 3, Orifice Metering of Natural Gas, August 1992 (AGA Catalog No. XQ9210).

A primary advantage of this invention is that pressures can be accurately measured despite temperature variations. In addition, accurate measurement of multiple types of pressure over large ranges of pressures without the expense of utilizing multiple pressure sensors is obtainable. Additionally, a financial savings is realized since all the diaphragms and channels are manufactured on the layers of the sensor at the same time; therefore, the monolithic sensor is no more expensive to produce than traditional single diaphragm sensors.

Even though particular embodiments of the present invention have been illustrated and described herein, this is not intended to limit the invention. It is therefore to be understood that modification and variation of the embodiments described above may be made without departing from the spirit or scope of the invention.

We claim:

1. Apparatus for measuring and comparing pressures, comprising:
   (a) means for detecting a temperature variation and for providing a temperature sensor signal representative of the temperature variation;
   (b) means for sensing an absolute pressure and for providing an absolute sensor signal representative of the absolute pressure;
   (c) means for sensing a differential pressure and for providing a differential sensor signal representative of the differential pressure;
   (d) means for selecting one of said temperature detecting means, absolute pressure sensing means or differential pressure sensing means for reading the respective sensor signal of the selected means;
   (e) means responsive to the selecting means for comparing the temperature sensor signal to the differential sensor signal and for generating a first comparative signal representative of the ratio between the temperature sensor signal and the differential sensor signal; and
   (f) means responsive to the selecting means for comparing the temperature sensor signal to the absolute sensor signal and for generating a second comparative signal representative of the ratio between the temperature reference signal and the absolute sensor signal.

2. The apparatus of claim 1 wherein the means for detecting the temperature variation is a fixed capacitor.

3. The apparatus of claim 2 wherein the means for sensing the absolute pressure is a first variable capacitor.

4. The apparatus of claim 3 wherein the means for sensing the differential pressure is a second variable capacitor.

5. The apparatus of claim 4 wherein the three capacitors are formed from a single, semiconductor substrate having a common capacitor plate.

6. The apparatus of claim 4 wherein the second variable capacitor comprises:
   a first electrically conductive common contact;
   a second electrically conductive capacitor contact; and
   a deflectable diaphragm structure having a deflection sensitivity which varies as a function of the pressures applied to either side of the diaphragm structure, a first side of the deflectable diaphragm structure in contact with a common pressure and a second side of the deflectable diaphragm structure in contact with the pressure to be measured, wherein the differential sensor signal is generated in direct proportion to the amount of deflection of the diaphragm structure and transmitted through the electrically conductive contacts.

7. The apparatus of claim 1 the means for selecting further comprises means for sequentially selecting detecting means, absolute pressure sensing or differential pressure means.

8. The apparatus of claim 1 wherein the detecting means and the two sensing means comprises a monolithic structure.

9. The apparatus of claim 1 further comprising means for converting the comparative signals into signals that are expressed as a function of frequency.

10. The apparatus of claim 9 further comprising means for storing both comparative signals.

11. The apparatus of claim 9 further comprising means for storing the reference sensor signal, the absolute sensor signal and the differential sensor signal.

12. The apparatus of claim 9 further comprising a frequency determining circuit connected to the means for generating the first and second comparative signals.

13. The apparatus of claim 12 further comprising means for sensing temperature and for providing a temperature sensing signal representative of the temperature of a body of liquid and/or gas which is being measured.

14. The apparatus of claim 13 further comprising means for processing the comparative signals and the temperature sensor signal to determine mass flow.

15. The apparatus of claim 1 further comprising means for providing pressure media isolation and electrical isolation of the apparatus.

16. In a system for measuring the pressure of a process fluid and for correcting the measurements for temperature variations, the improvement comprising:
   a capacitive sensor for detecting temperature variations.

17. The system of claim 16 further comprising a processing means for calibrating the capacitive temperature sensor.

18. In a system for measuring the pressure of a process fluid and for correcting the measurements for temperature variations, the improvement comprising:
   a monolithic capacitive sensor structure having a capacitor for determining temperature variations, a capacitor for determining an absolute pressure and a third capacitor for determining a differential pressure between the absolute pressure and a second pressure.

* * * * *